United States Patent [19]
Pehrson et al.

[11] Patent Number: 4,654,103
[45] Date of Patent: Mar. 31, 1987

[54] TRIDENT II BASELINE POWER EMBEDMENT CASE BOND SYSTEM

[75] Inventors: West F. Pehrson; Robert J. Baczuk, both of Salt Lake City, Utah

[73] Assignee: The United States of America as represented by the Secretary of the Navy, Washington, D.C.

[21] Appl. No.: 751,823

[22] Filed: Jul. 5, 1985

[51] Int. Cl.⁴ ............................................. B32B 31/00
[52] U.S. Cl. ...................................... 156/276; 86/1.1; 156/90; 156/153; 156/298; 156/330; 427/183; 427/203
[58] Field of Search .................. 427/183, 203; 156/90, 156/276, 153, 330, 298; 86/1 R; 106/163.1

[56] References Cited
U.S. PATENT DOCUMENTS 3,303,041  2/1967  Thompson ........................ 427/183
4,076,869  2/1978  Flynn .................................. 156/330
4,131,051 12/1978  Schaffling ............................ 86/1 R Primary Examiner—John J. Gallagher
Attorney, Agent, or Firm—R. F. Beers; C. D. B. Curry; S. G. Precivale

[57] ABSTRACT

A method of bonding propellant to the insulation in a motor chamber by use of an adhesive and powder granule layer.

14 Claims, No Drawings

TRIDENT II BASELINE POWER EMBEDMENT CASE BOND SYSTEM

BACKGROUND OF THE INVENTION

1. Field of the Invention

This invention relates to propellants. More particular, this invention relates to a method of bonding the propellant to the liner or insulation inside the motor chamber. Still more particularly, but without limitation thereto, this invention relates to powder granule embedment.

2. Description of the Prior Art

Traditional methods of bonding propellants to the motor chamber liner can result in unbonded areas. These areas can be dangerous as they increase the burning surface area. The propellant flame flashes through these unbonded areas thus resulting in rupturing of the motor casing.

Another problem associated with state of the art bond systems is migration of the nitroglycerin in the propellant into the liner, which results in weakening of the propellant-liner bond. The present invention utilizes a nitrocellulose containing powder which is embedded into a resin layer between the propellant and the liner. The nitrocellulose acts to contain any migrating nitroglycerin thereby preventing weaking of the bond.

SUMMARY OF THE INVENTION

An object of this invention is to develop a method of bonding the propellant to the liner or insulation inside the motor chamber.

A further object is to develop a bond which will not allow the propellant to separate from the insulation, i.e. no unbonded areas.

These and other objects have been demonstrated by the present invention wherein the inside surface of the liner or insulation is coated with adhesive and partially embedded with powder granules followed by casting the propellant against the adhesive and partially embedded granules.

DESCRIPTION OF THE PREFERRED EMBODIMENT

The power embedment case bond system comprises of bonding propellant to the liner or insulation inside the motor chamber. The general steps consist of coating the inside surface of the liner or insulation with an adhesive and partially embedding powder granules into the resin. The propellant is then cast against the adhesive/granule layer.

Prior to coating the chamber with adhesive, several preparatory steps must be done. First, the inner surface of the chamber is cleaned with a solvent such as 1,1,1-trichloroethane. The chamber is then allowed to air dry for at least 10 minutes at a minimum of 65° F.

The second prepatory step involves buffing the embedment surface of the insulator (a peroxide cured ethylene propylenediene monomer). This can be done by using a 60 grit aluminum oxide disc sander accompanied by hand sanding with 60 grit aluminum oxide in the concave areas. This light buffing removes the surface sheen, thereby roughening the insulator surface to facilitate adhesion. The surface is then dried for a minimum of 60 hours at 135°±5° F. The last step involves cooling the surface at 75°±5° F. for a minimum of 6 hours prior to application of the adhesive.

Optimum conditions for application of the adhesive is 75°±5° F. and a maximum humidity of 50% RH. The temperature of the adhesive itself, should not exceed 80° F. A vacuum of 17.5 Hg minimum in the insulator/liner cavities is maintained throughout the process.

This invention utilizes a two-part adhesive which comprises an epoxy resin base and an amine curing agent.

The epoxy resin base has a weight per epoxy equivalent of about 340-370 g/equiv, and its viscosity at 25° C. is within the range of 100-300 poise. The base is comprised mainly of the epoxy resin: diglycidyl ether of bisphenol A and a low viscosity epoxy flexibilizer such as a dimer timer mixture of fatty acids. The base also has a suspensoidal filling agent (about 2.4-3.4 weight percent), a polar agent and a trace amount of water (about 0.4 weight percent). The filling agent may be fumed silica (Cab-O-Sil, Cabot Co.) or a clay material comprised of bentonite (Bentone, National Lead Co., Chemical Division). The polar agent is 95% methanol.

The amine curing agent has 15.7-18.0 percent titratable nitrogen. It has the following composition: 30 weight percent of an amine mixture comprising metaphenylenediamine (MPDA) and methylenedianiline (MDA), having 40 parts MPDA to 60 parts MDA; 30 weight percent MPDA; 30 weight percent of a mixture of MPDA and isopropyl metaphenylenediamine cumenediamine (CDA), having 40 parts MPDA to 60 parts CDA; and 10 weight percent of 2, 4-dinitrophenol (DNP) and water, having 84-90 parts DNP to 10-16 parts water.

The amine curing agent is made by combining the MPDA/MDA mixture (tan chunks) with the MPDA (off white crystals) in a large drum, and placing the drum in a 140°-150° F. hot air oven for several days. Then the MPDA/CDA is added and mixed well. As this point, the mixture is about 123° F. and is pumped and filtered through a 200 mesh SS screen which has been cleaned with methylethyl ketone. At this point, the mixture is about 118° F. and the DNP (yellow crystals) is added. The mixture is heated to 160° F. and mixed well. Then it is pumped and filtered as above to yield the amine curing agent.

The adhesive is comprised of about 86.75-87.29 weight percent epoxy resin and about 12.71-13.25 weight percent curing agent. Cured, it has a bond shear strength value of 1500 psi, tensile strength of 800 psi, and elongation of 50%. Also, measurement of the refractive index between 12 and 192 minutes after mixing indicates a change in index of 0.0045-0.0065.

Application of the adhesive to the insulation is accomplished by spraying the inside of the chamber as it rotates at a rate of 5.75-6.25 rpm. The spray pattern is such that a uniform thickness of adhesive is applied and its thickness controlled to 0.011-0.015 inches. A minimum of four passes around the inside of the chamber is required, each pass using approximately 3 pounds of adhesive. The rate of spraying is 0.5 pound adhesive/minute. The adhesive may be brushed on (0.012-0.006 inches thick) at the neck of the chamber.

After application is complete, the adhesive is allowed to partially cure (70°±1-°F.) to a tacky stage. This is to insure proper penetration of the powder granules. During this partial cure, the chamber is continually rotating at 3-5 rpm.

The powder granules used in this case bond system are made of nitrocellulose, nitroglycerin, 2-nitrodiphenylamine, cyclotetranethylenetetranitramine (HMX), oxamide and a trace amount of graphite. The relevant weight percentages are presented in Table I:

TABLE I

| Embedment Powder Composition | |
|---|---|
| Material | Percent of Weight |
| Nitrocellulose | 18.00–22.00 |
| Nitroglycerin | 15.00–17.00 |
| 2-Nitrodiphenylamine | 0.85–1.15 |
| HMX | 56.35–59.65 |
| Oxamide | 4.50–5.50 |

The HMX used is the beta form and has a weight median particle size of about 8–20 μm. Graphite is present to act as a glaze on the embedment powder and comprises less than 0.08% of the granule weight.

The granules have a minimum density of 1.720 g/cm$^3$. The granules are from about 0.044–0.054 inches in length and from about 0.044–0.054 inches in diameter, with the length to diameter ratio being within the range of 0.9 to 1.1.

The moisture content of these granules is limited to a maximum 0.20 weight percent. Likewise, the amount of volatiles is limited to a maximum of 0.48 weight percent.

Embedment of the powder granules requires two passes while the chamber rotates at 5.75–6.25 rpm, and is done by spraying. After spraying is complete, the chamber is rotated approximately 45° every 1–3 minutes and any excess loose powder is removed by vacuum. The embedded powder adhesive layer, i.e. the partially embedded granules protrude about 0.025 inches from the adhesive.

The adhesive, with the powder granules partially embedded, is then allowed to fully cure at ambient temperature. The chamber is rotated at 3–5 rpm for at least 2 hours then maintained in a 70°±10° F. environment for a period of 20 hours from the time the adhesive was mixed. The inside of the chamber is then brushed to remove any loose granules from the embedded surface. Said loose granules are then removed by vacuum.

The chamber is now ready for casting of the propellant which is poured and allowed to cure, fully encapsulating the exposed granules.

This invention has been described in detail with particular reference to certain preferred embodiments thereof, but it will be understood that variations and modifications can be effected within the spirit and scope of the invention.

What is claimed is:

1. A method of bonding propellant to the insulation inside of a motor chamber as said chamber continuously rotates comprising the steps of:
    (a) applying an adhesive to said insulation to form an adhesive layer where said adhesive comprises about 86.75–87.29 weight percent epoxy resin base and about 12.71–13.25 weight percent amine curing agent;
    (b) partially curing said adhesive layer to a tacky state;
    (c) embedding power granules in said adhesive layer to form an embedded surface where said powder granules comprise on a weight percent basis: about 18.00–22.00 percent nitrocellulose, about 15.00–17.00 percent nitroglycerin, about 0.85–1.15 percent 2-nitrodiphenylamine, about 56.35–59.65 percent cyclotetramethylentetranitramine, and about 4.50–5.50 percent oxamide;
    (d) fully curing said embedded surface; and
    (e) casting said propellant into said motor chamber so as to bond said propellant to said insulation by means of said embedded surface.

2. The method of claim 1 wherein said applying step is carried on by spraying said adhesive onto said insulation.

3. The method of claim 1 wherein said applying step forms an adhesive layer about 0.011–0.015 inches in thickness.

4. The adhesive of claim 1 wherein said epoxy resin base is comprised of an epoxy resin, a suspensoidal filling agent and a polar agent.

5. The base of claim 4 wherein said epoxy resin is comprised of the diglycidyl ether of bisphenol A and as a low viscosity epoxy flexibilizer, the dimer trimer mixture of fatty acids.

6. The base of claim 4 wherein said filling agent is selected from the group consisting of fumed silica and a clay material comprised of bentonite.

7. The base of claim 6 wherein said filling agent comprises about 2.4–3.4 weight percent of said base.

8. The base of claim 4 wherein said polar agent is 95% methanol.

9. The adhesive of claim 4 wherein said amine curing agent is comprised of:
    (a) 30 weight percent amine mixture having 40 parts metaphenylenediamine and 60 parts methylenedianiline;
    (b) 30 weight percent metaphenylenediamine;
    (c) 30 weight percent amine mixture having 40 parts metaphenylenediamine and 60 parts isopropyl metaphenylenediamine cumenediamine; and
    (d) 10 weight percent dinitrophenol mixture having 84–90 parts 2,4-dinitrophenol and 10–16 parts water.

10. The method of claim 1 wherein said partially curing step is carried on at 70°±10° F.

11. The method of claim 1 wherein said embedding step is carried on by spraying said powder granules onto said adhesive layer.

12. The method of claim 1 wherein said powder granules further comprise a trace amount of graphite.

13. The method of claim 1 wherein said powder granules have a minimum density of 1.720 g/cm$^3$.

14. The method of claim 1 wherein said fully curing step is carried out at ambient temperature.

* * * * *